United States Patent [19]
Hatayama et al.

[11] Patent Number: 5,402,155
[45] Date of Patent: Mar. 28, 1995

[54] APPARATUS FOR SCANNING DRUM INNER FACE AND METHOD OF SCANNING THEREFOR

[75] Inventors: Fumihiro Hatayama; Yoshiaki Morizumi, both of Kyoto, Japan

[73] Assignee: Dainippon Screen Mfg. Co., Ltd., Kyoto, Japan

[21] Appl. No.: 938,805

[22] Filed: Sep. 1, 1992

[30] Foreign Application Priority Data

Sep. 4, 1991 [JP] Japan ................... 3-253167

[51] Int. Cl.⁶ ........................................... B41J 2/435
[52] U.S. Cl. ................................................ 347/247
[58] Field of Search ................ 346/1.1, 76 L, 107 R, 346/108, 160

[56] References Cited

U.S. PATENT DOCUMENTS

| | | | |
|---|---|---|---|
| 4,260,997 | 4/1981 | Fukui | 346/108 |
| 4,698,647 | 10/1987 | Gerlach | 346/107 |
| 4,807,213 | 2/1989 | Chung et al. | 346/108 |

FOREIGN PATENT DOCUMENTS

112583 7/1984 European Pat. Off. .
126469 11/1984 European Pat. Off. .

*Primary Examiner*—Mark J. Reinhart
*Attorney, Agent, or Firm*—Ostrolenk, Faber, Gerb & Soffen

[57] ABSTRACT

A light beam output device eliminates the disposition change of plural light beam spots on the inner face of a drum, thus allowing image recording with plural light beams. The light beam output unit emits a light beam modulated according to binary image data representing an image to be recorded and transmits the light beam along a center axis of a drum. A light receiving device of a scanning unit receives the light beam and converts the light beam into serial data. A serial/parallel converter unit further converts the serial data into parallel image signals. A driver unit actuates and drives an array composed of plural light emitting devices, which irradiate plural light beams based on the parallel image signals. With a rotational force of a main scanning motor, the scanning unit rotates about the center axis of the drum. The plural light beams emitted from the array are thereby rotated around the center axis of the drum.

20 Claims, 8 Drawing Sheets

APPARATUS FOR SCANNING DRUM INNER FACE AND METHOD OF SCANNING THEREFOR

BACKGROUND OF THE INVENTION

1. Field of the Invention

The present invention relates to an optical apparatus for scanning an inner face of a drum, and more particularly to an image recording apparatus of a drum-inner-face scanning type for recording an image on a recording medium such as a photosensitive film held on the inner face of a drum. The present invention also relates to a method of scanning an inner face of a drum.

2. Description of Related Art

Drum type image recording scanners include two types which differ on where to mount a photosensitive film. The first type holds a photosensitive film on the outer face of the drum on which light beams scan to record an image, and the second type holds a photosensitive film on the inner face of the drum.

In the first type, or the drum-outer-face scanning type, a recording head for emitting light beams is disposed outside the drum and the main scanning is performed by rotation of the drum. The drum-outer-face scanning type has an advantage of the ease with which plural light beams can be used for scanning. However, this first type has disadvantages of the relatively large size because of the recording head disposed outside the drum and of the need for relatively large power to rotate the drum.

In the second type, or the drum-inner-face scanning type, a recording head is disposed inside the drum and the main scanning can be performed by rotation of the recording head. An example of the drum-inner-face scanning type is disclosed in U.S. Pat. No. 4,853,709. The drum-inner-face scanning type has advantages of having a relatively small size and less need for power to rotate the recording head.

Figure 1:
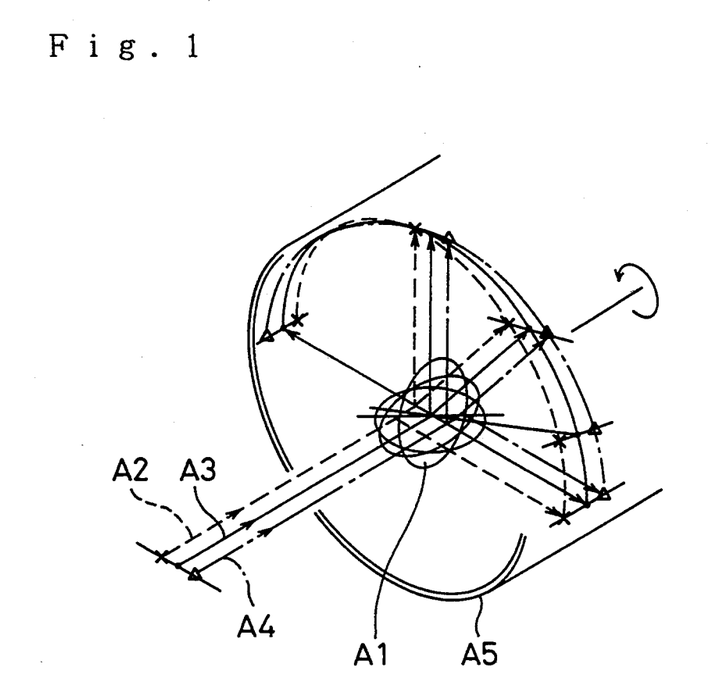
FIG. 1 schematically illustrates a problem of multi-beam scanning for the drum-inner-face scanning type apparatus.

Multibeam scanning is preferable in order to increase the recording speed. However, the drum-inner-face scanning type has the following problem in multibeam scanning and thus, has not been used as much. FIG. 1 schematically illustrates the problem when the plural beams were used in the drum-inner-face scanning type. Plural light beams A2, A3 and A4 go along the axis of a drum A5, and are reflected at a mirror A1 to be incident on the inner face of the drum A5. The mirror A1 rotates to perform the scanning of the inner face of the drum by the plural beams. Disposition of the light beam spots on the inner face of the drum A5 are varied with the rotational position of the mirror A1, and eventually, the order of the plural light beams is inverted, for example, from (A2, A3, A4) to (A4, A3, A2) at opposite sides of the drum. Scanning lines of the plural light beams thus cross one another on the photosensitive film on the inner face of the drum, and this makes the multibeam scanning impossible in the image recording apparatus of the drum-inner-face scanning type.

The same problem is observed when a pentagonal prism is used, as in the U.S. Pat. No. 4,853,709, in place of the mirror A1.

SUMMARY OF THE INVENTION

An object of the invention is to eliminate the disposition change of plural beam spots on the inner face of a drum.

The present invention is directed to an apparatus for scanning an inner face of a cylindrical member with a light beam. The apparatus preferably includes the following elements:

- a light beam output for emitting a first modulated light beam in response to given image data;
- an optical/electrical signal converter means, disposed on a center axis of the cylindrical member apart from the light beam output, for receiving the first modulated light beam, and converting the first modulated light beam into an image signal representing the image;
- a light beam emitter, mounted around the center axis of the cylindrical member, for emitting a second modulated light beam toward the inner face of the cylindrical member in response to the image signal; and
- a scanner for integrally rotating the optical/electrical signal converter and the light beam emitter about the center axis of the cylindrical member, to thereby scan a recording medium held on the inner face of the cylindrical member with the second modulated light beam.

The present invention is also directed to an apparatus for scanning an inner face of a cylindrical member with plural light beam. The apparatus preferably includes the following elements:

- a light beam output for emitting a first modulated light beam in response to given image data, the given image data representing an image along a scanning line on the image;
- an optical/electrical signal converter, disposed on a center axis of the cylindrical member apart from the light beam output, for receiving the first modulated light beam, and converting the first modulated light beam into parallel image signals representing the image on plural scanning lines;
- a plural-light-beam emitter, mounted around the center axis of the cylindrical member, for emitting a plurality of modulated light beams toward the inner face of the cylindrical member in response to the parallel image signals; and
- a scanner for integrally rotating the optical/electrical signal converter and the plural-light beams emitter about the center axis of the cylindrical member, to thereby scan a recording medium held on the inner face of the cylindrical member with the plurality of modulated light beams.

According to an aspect of the present invention, the optical/electrical signal converter includes the following elements:

- an optical/serial converter for receiving the first modulated light beam emitted from the light beam output and generating serial image signals corresponding to the intensity of the modulated light beam; and
- a serial/parallel converter for converting the serial image signals into the parallel image signals.

Preferably, the apparatus includes a support member, disposed within the cylindrical member, for supporting the optical/serial converter, the serial/parallel converter, and the plural-light-beam emitter; and wherein the scanner includes a device for rotating the support member about the center axis of the cylindrical member.

According to another aspect of the present invention, the plural-light-beams emitter includes a plurality of light emitting devices arranged in parallel with the center axis of the cylindrical member.

According to still another aspect of the present invention, at least one of the plurality of light emitting devices is positionally shifted in a direction perpendicular to the center axis of the cylindrical member; and the apparatus further including a delay processor for delaying at least one of parallel image signals to be supplied to the shifted light emitting device according to an amount of the positional shift.

According to the preferred embodiments, the given image data is a program written in a page description language; and the light beam output further includes a device for interpreting the program, and generating the first modulated light beam based on the program.

According to the preferred embodiments, the serial/parallel converter further includes:

a memory element having a memory matrix for M×N pixels, where M is an integer representing a maximum number of pixels in a main scanning direction of the image, and N is an integer equal to the number of the plural scanning lines;

a writing device for successively writing the serial image signals in the memory matrix; and a reading device for reading N-bit parallel image signals out of the memory matrix.

According to the preferred embodiments, the scanner includes a driving motor having a shaft connected to one end of the support member and rotating the support member about the center axis of the cylindrical member.

According to another aspect of the present invention, the apparatus includes a generator, disposed on the support member, for converting energy of rotation of the support member into electric power; and a power supply for supplying the electric power to the optical/serial converter, the serial/parallel converter, and the plural-light-beam emitter.

Preferably, the apparatus includes the following elements:

a conductive slip ring mounted on the circumference of the support member;

conductive brushes, disposed in contact with the slip ring, for sending electric power supplied from an external device to the slip ring; and a power supply for supplying the electrical power received by the slip ring to the optical/serial converter, the serial/parallel converter, and the plural-light-beam emitter.

Preferably, the apparatus includes a battery disposed on the support member.

The present invention is further directed to a method of scanning an inner face of a cylindrical member with a light beam. The method preferably includes the steps of:

(a) emitting a first modulated light beam in response to given image data;

(b) receiving the first modulated light beam emitted in the step (a), converting the first modulated light beam into an image signal representing the image;

(c) emitting a second modulated light beam toward the inner face of the cylindrical member in response to the image signal; and (d) scanning a recording medium held on the inner face of the cylindrical member with the second modulated light beam by rotating an electrical path of the image signal and an optical path of the light beam about the center axis of the cylindrical member simultaneously with execution of the steps (b) and (c).

DESCRIPTION OF THE PREFERRED EMBODIMENTS

Figure 2:
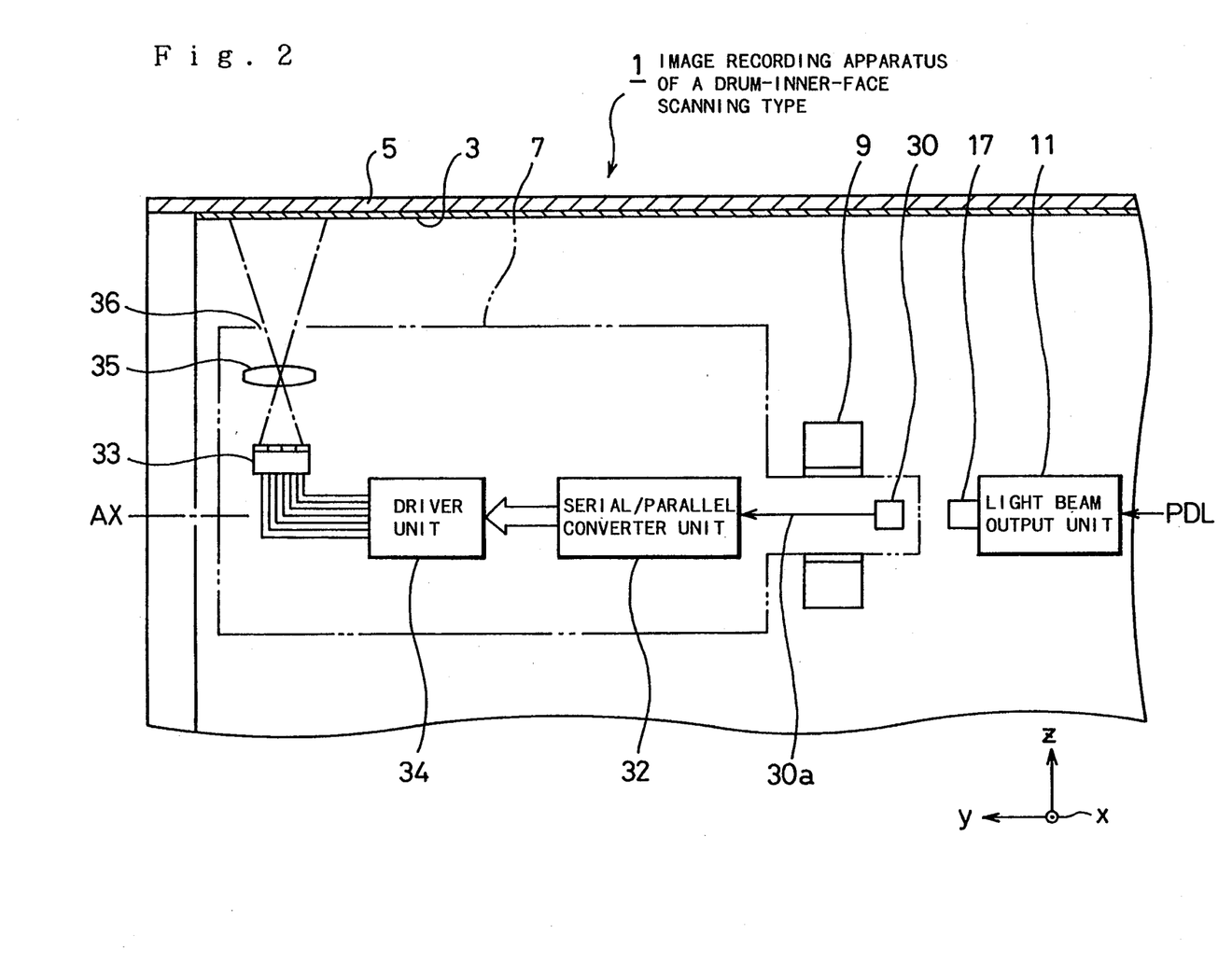
FIG. 2 is a schematic view illustrating a drum-inner-face scanning image recording apparatus as a preferred embodiment of the invention.
Figure 3:
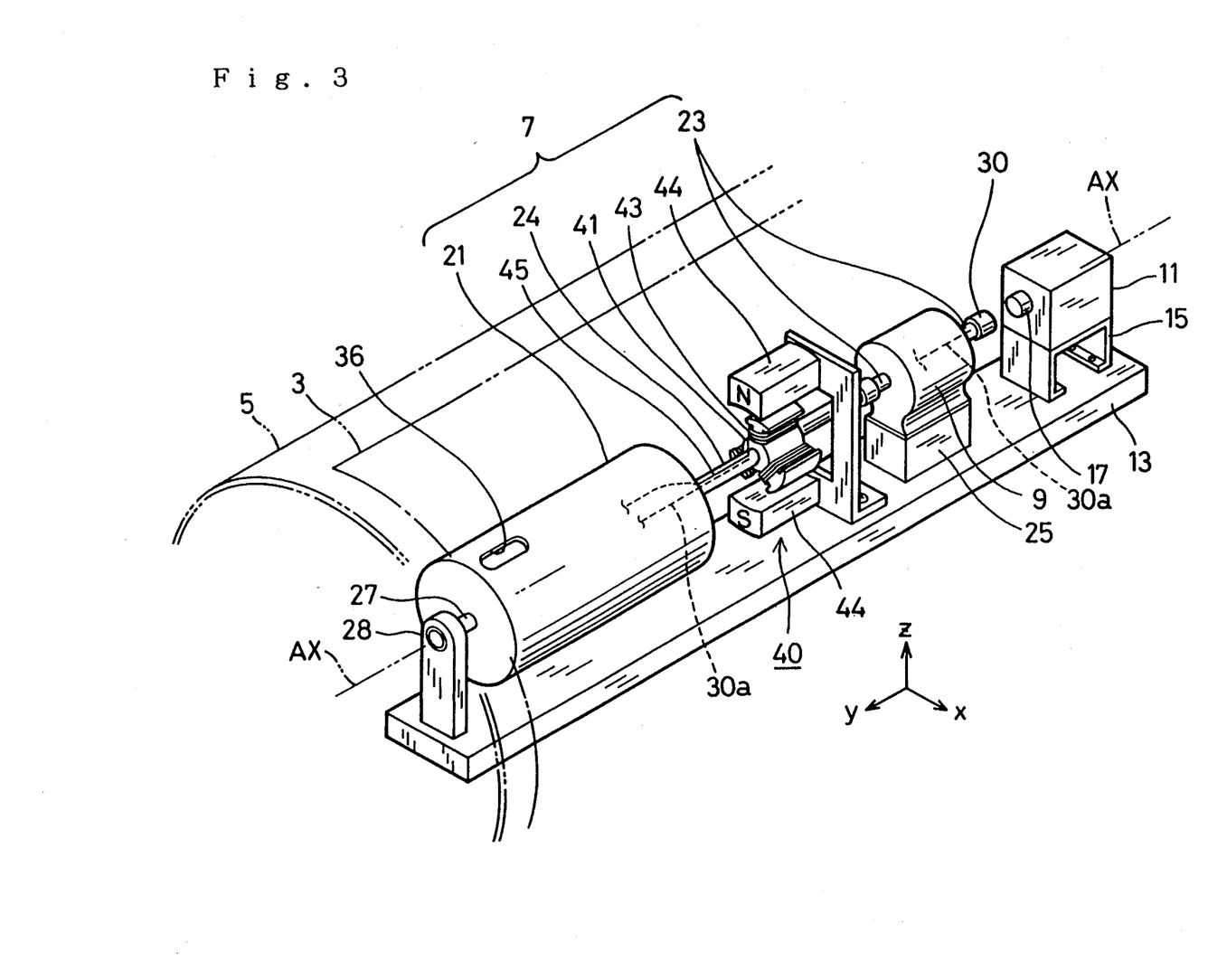
FIG. 3 is a perspective view illustrating the drum-inner-face scanning image recording apparatus of FIG. 2.

FIG. 2 is a schematic view illustrating an image recording apparatus of a drum-inner-face scanning type according to the invention. FIG. 3 is a perspective view illustrating the image recording apparatus of FIG. 2.

The image recording apparatus 1 includes a drum (or a cylinder) 5 with a photosensitive film 3 held on the inner surface thereof. The drum 5 includes several built-in elements: a scanning unit 7 rotatable around a center axis AX of the drum 5; a main scanning motor 9 for rotating the scanning unit 7; and a light beam output unit 11 for transmitting a light beam to the scanning unit 7 (in y direction of FIG. 2) along the center axis AX of the drum 5.

The light beam output unit 11 interprets a program written in a page description language (generally referred to as PDL) to binary image data representing one-page-image, and further generates a modulated light beam corresponding to the binary image data. The light beam output unit 11 includes a light emitting device 17, such as a laser, for emitting a light beam to the scanning unit 7 along the center axis AX of the drum 5. The light beam output unit 11 is fixed onto a base 13 with a stand 15 as clearly seen in FIG. 3. The structure of the light beam output unit 11 will be described later in detail.

As shown in FIG. 3, the scanning unit 7 includes: a cylinder element 21; a shaft 23 of the main scanning motor 9; and a connection shaft 24 joining the cylinder element 21 to the shaft 23. The cylinder element 21, the connection shaft 24, and the shaft 23 of the main scanning motor 9 are connected to one another in this sequence (in -y direction) and integrally form a hollow channel.

The main scanning motor 9 is mounted onto a motor stand 25 fixed to the base 13. A rotary shaft 27 projecting from one end of the cylinder element 21 opposite to the connection shaft 24 is supported with a bearing of a support 28. Each member of the scanning unit 7 mounted above the base 13 integrally rotates about the center axis AX of the drum 5 when the main scanning motor 9 revolves about the shaft 23.

A light receiving device 30 for receiving a light beam emitted from the light beam output unit 11 is fixed to one end of the shaft 23 to face the light emitting device 17 of the light beam output unit 11. A signal wire 30a runs from the light receiving device 30 to the cylinder element 21 through the hollow channel of the shaft 23 and the connection shaft 24.

As shown in FIG. 2, a serial/parallel converter unit 32 and a driver unit 34 are further disposed in the cylinder element 21 of the scanning unit 7. The serial/parallel converter unit 32 receives serial data output from the light receiving device 30 through the signal wire 30a and converts the serial data into parallel data. The driver unit 34 drives a light emitting array 33, which includes plural light emitting devices (four light emitting devices in the embodiment), in response to the parallel signals supplied from the serial/parallel converter unit 32. Four light beams emitted from the light emitting array 33 go into a focusing lens 35, which is also disposed in the scanning unit 7, go through an opening 36 of the cylinder elements 21, and reach a photosensitive film 3 held on an inner face of the drum 5.

A generator 40 is attached to the circumference of the connection shaft 24 as shown in FIG. 3. The generator 40 may be of any known type including: an armature core 41 fixed to the connection shaft 24; an armature coil 43 wound on the armature core 41; and a pair of magnets 44 disposed on the top and bottom of the armature coil 43. Rotation of the connection shaft 24 revolves the armature coil 43, which sequentially passes through the magnetic flux of the magnets 44 to generate power. The power is supplied to electronic parts built in the cylinder element 21 through electrical wire 45.

Figure 4:
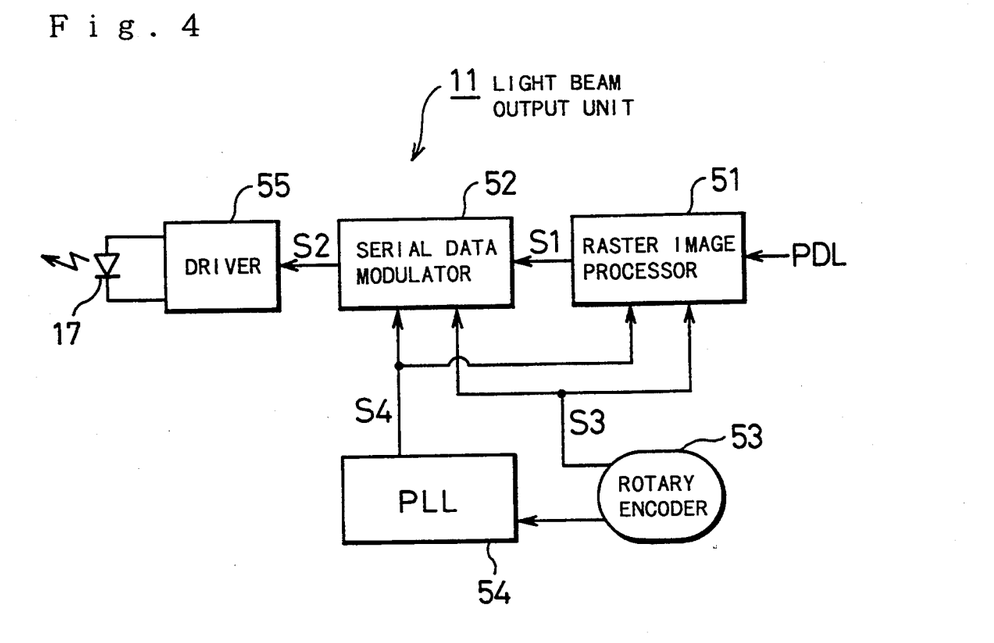
FIG. 4 is a block diagram showing a light beam output unit of the drum-inner-face scanning image recording apparatus of FIG. 3.

FIG. 4 is a block diagram showing the detailed structure of the light beam output unit 11. The light beam output unit 11 includes a raster image processor 51, a serial data modulator 52, a rotary encoder 53, a phase locked loop (hereinafter referred to as PLL) circuit 54, a driver 55, and the light emitting device 17.

Figure 5:
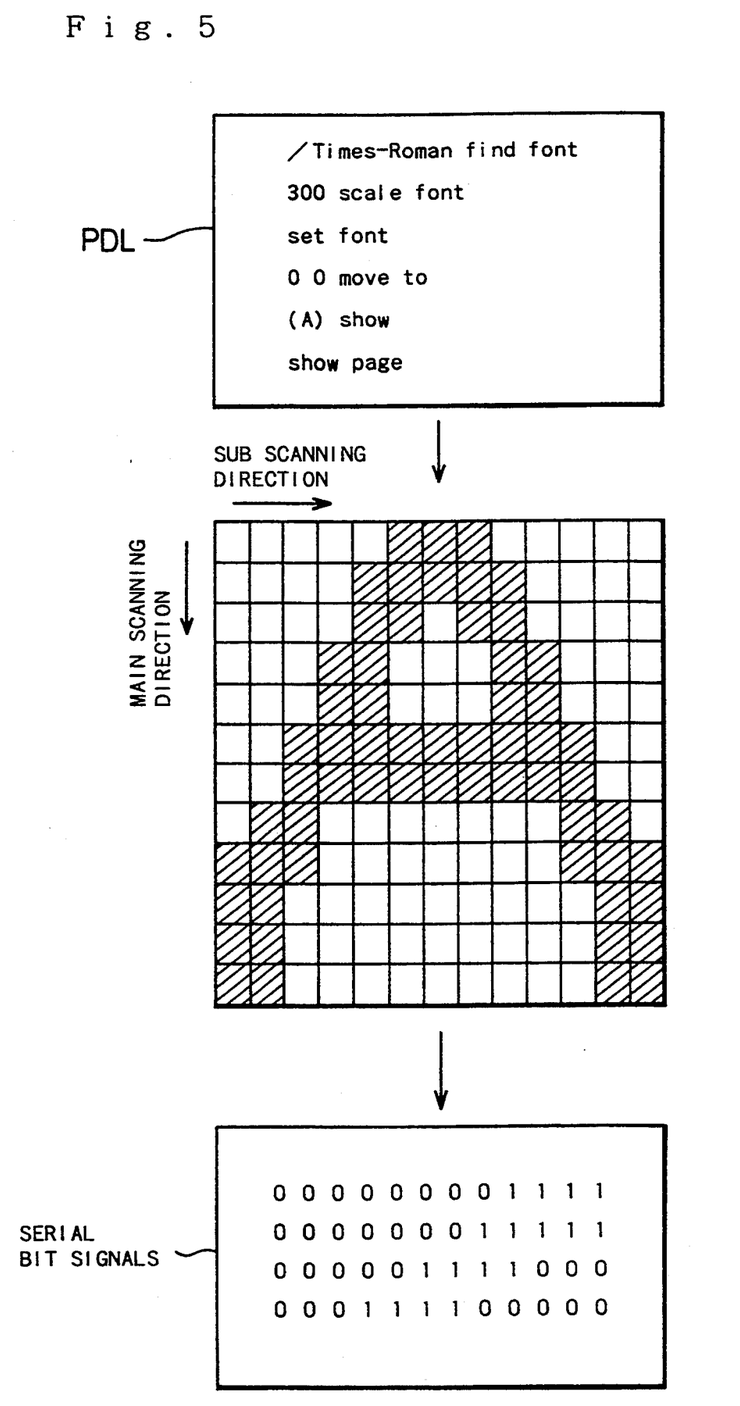
FIG. 5 illustrates processing executed by an image processor of the light beam output unit of FIG. 4.

The raster image processor 51 receives a PDL program created by computer equipment (not shown) and generates binary image signals representing one-page-image based on the PDL program. The raster image processor 51 successively outputs these binary image signals in the order of main scanning lines of the image recording apparatus 1. Here the main scanning direction is parallel to the circumference of the drum 5. FIG. 5 shows an example of such processing. When an image of an alphabet 'A' is input as a PDL program, binary image data representing 'A' is developed on the coordinates of x (subscanning direction) and y (main scanning direction). Serial one-bit signals S1 (values 0 and 1) of the binary image data on each subscanning line are output one by one in the main scanning direction y.

The serial data modulator 52 receives the serial one-bit signals S1 supplied from the raster image processor 51, and executes required processing on the serial one-bit signals S1 to generate processed serial data S2. The required processing includes data supplement essential for serial data communication; for example, opening flags, control fields, CRC fields, and closing flags are supplemented in SDLC (synchronous data link control) type data communication. The processing further includes correction of bit patterns; for example, zero insertion and zero deletion in SDLC data communication. The serial data S2 is then transmitted to the driver 55 for driving the light emitting device 17.

The rotary encoder 53 (not shown in FIG. 3) mounted on the shaft of the main scanning motor 9 generates a pulse signal S3 corresponding to a rotation of the main scanning motor 9, and supplies the pulse signals S3 to the raster image processor 51, the serial data modulator 52, and the PLL circuit 54. The PLL circuit 54 multiplies the frequency of the pulse signals S3 to a frequency corresponding to the resolution of recorded pixels, thereby generating a pixel clock signal S4. The raster image processor 51 outputs the serial signal S1 at a timing defined by the pulse signal S3 and the pixel clock signal S4 while the serial data modulator 52 outputs the processed serial data S2 at the same timing. The pulse signal S3 determines the shift timing in the subscanning direction X (or the start timing of each main scanning line). The pixel clock signal S4, on the other hand, determines the output timing of each bit data in the main scanning direction y.

Figure 6:
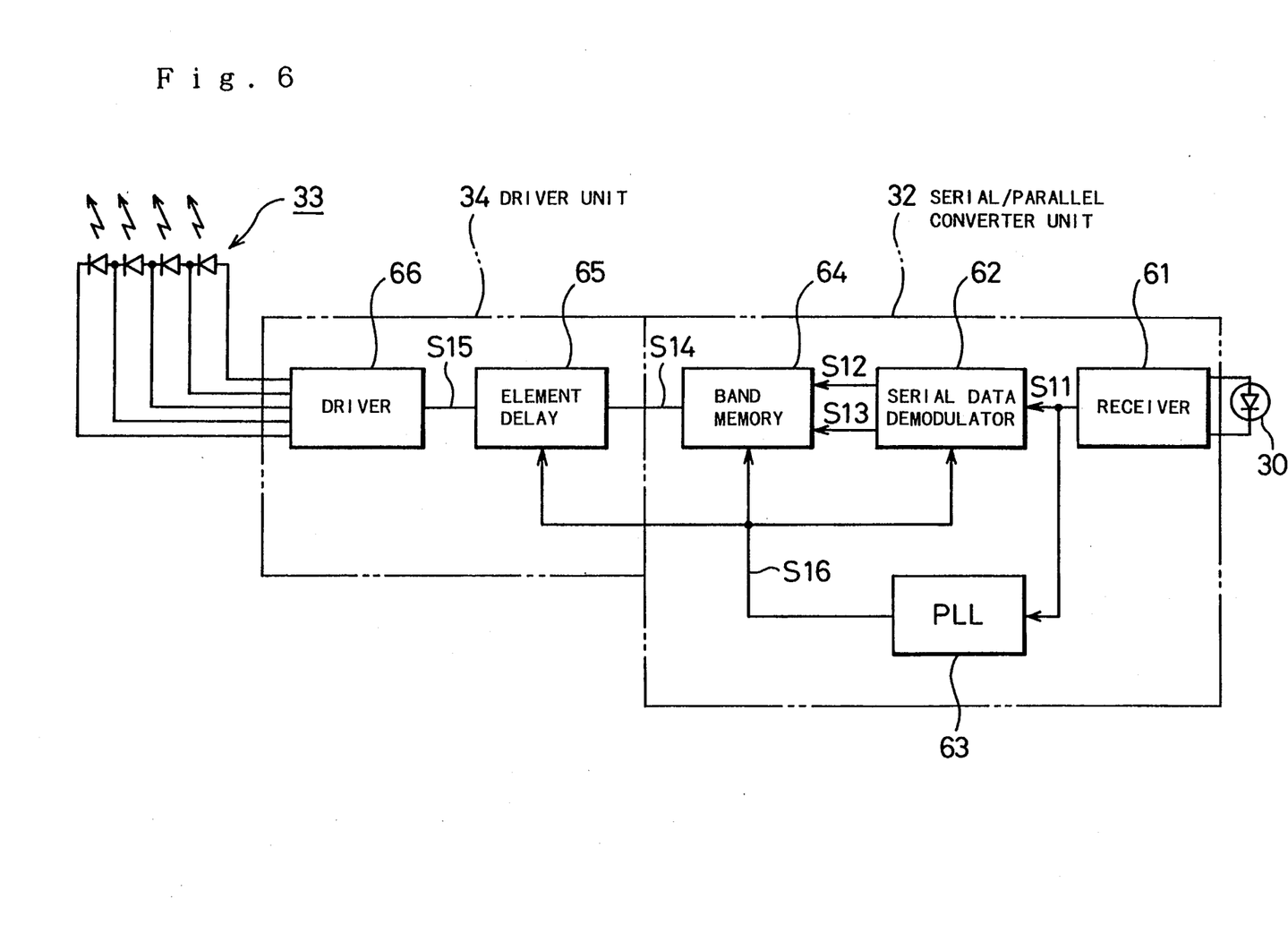
FIG. 6 is a block diagram showing various elements built in a scanning unit of the drum-inner-face scanning image recording apparatus.

FIG. 6 is a block diagram showing the detailed structure of the serial/parallel converter unit 32 and the driver unit 34 disposed in the cylinder element 21.

The serial/parallel converter unit 32 includes: a receiver 61 connected to the light receiving device 30; a serial data demodulator 62 for receiving output signals from the receiver 61; a band memory unit 64 for receiving output signals from the serial data demodulator 62; and a PLL circuit 63 for supplying a clock signal S16 to serial data demodulator 62 and band memory 64.

The receiver 61 receives serial data produced by the light receiving device 30, and amplifies and shapes the waveform of the serial data to output serial data S11, which corresponds to the processed serial data S2 of the light beam output unit 11 (see FIG. 4). The serial data demodulator 62 receives the serial data S11 to generate and output serial one-bit signals S12 and main-scanning start signals S13. The serial one-bit signals S12 are equivalent to the serial signals S1 prior to being modulated by the serial data modulator 52 of the light beam output unit 11. The main-scanning start signals S13 are equivalent to the pulse signals S3 output from the rotary encoder 53 of the light beam output unit 11.

Figure 7:
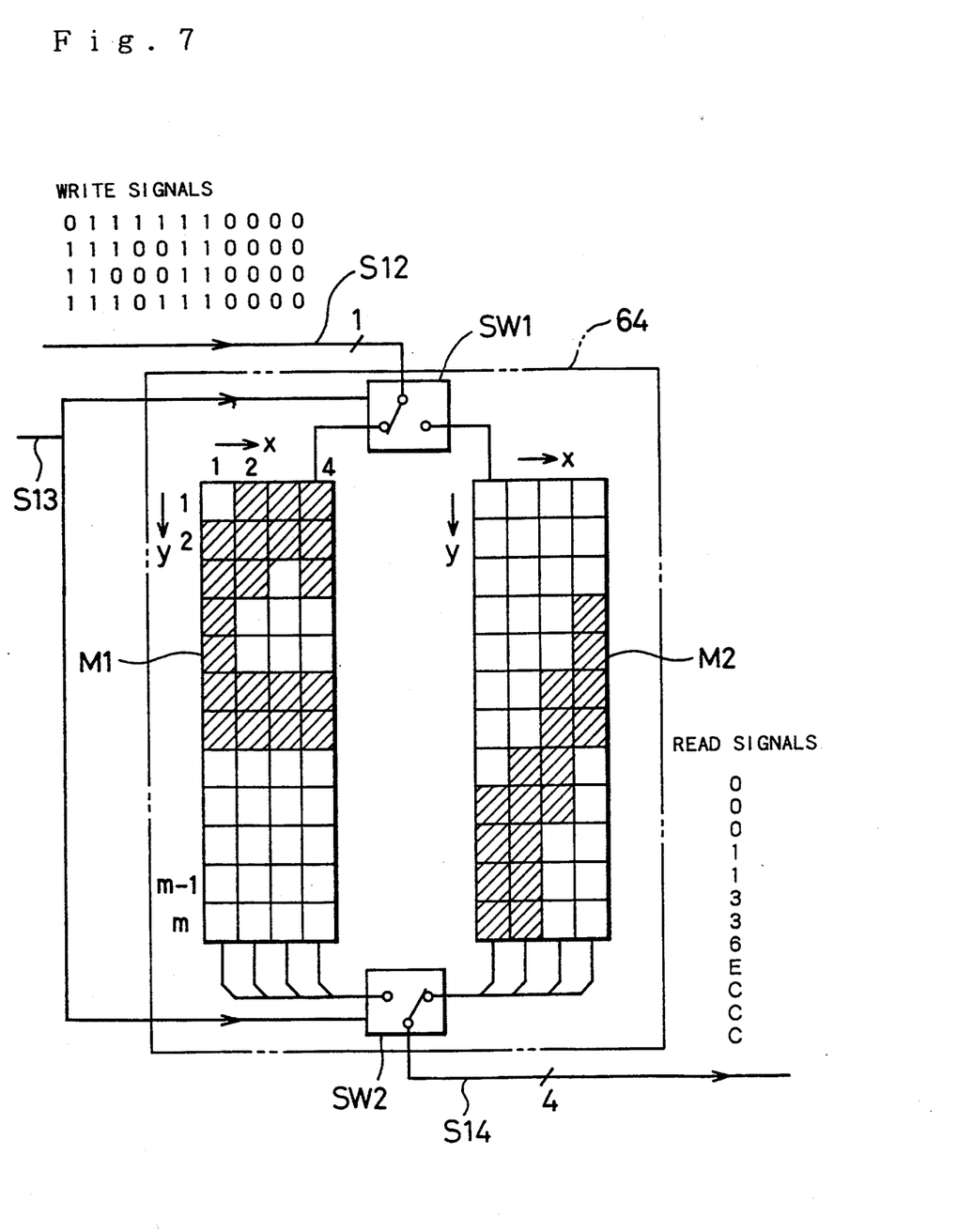
FIG. 7 schematically illustrates the inside of a band memory unit.

Both of the output signals S12 and S13 are transmitted to the band memory unit 64. As shown in FIG. 7, the band memory unit 64 has two memories M1 and M2, each having a capacity of the number of pixels determined by multiplying a maximum pixel number m in the main scanning direction y by 4 (equals the number of light emitting devices of the array 33). One of the first and second memories M1 and M2 is selected for writing with a first switch SW1 while the other memory is selected for reading with a second switch SW2. The serial one-bit signals S12 are input through the first switch SW1 at a timing defined by the main-scanning start signals S13.

The serial one-bit signals S12 are written one by one along each main scanning line into the memory M1 selected with the first switch SW1. Here the last bit of a first main scanning line is followed by the first bit of a second main scanning line adjacent to the first scanning line. In this manner, pixel data of the four main scanning lines corresponding to the four light emitting devices of the array 33 are written into the memory M1 selected with the first switch SW1. Then the first memory M1 is selected with the second switch SW2, and pixel data for the four main scanning lines stored in the first memory M1 is simultaneously read out as parallel signals. Four-bit parallel signals S14 each corresponding to a subscanning line are successively output from the band memory unit 64. The two switches SW1 and SW2 function in a complementary manner; that is, whenever the first switch SW1 selects the memory M1, the second switch SW2 selects the memory M2. Namely, serial data is written into one of the two memories M1 and M2 while previously stored data is read out as parallel data from the other memory.

The parallel pixel signals S14 are then transmitted to the driver unit 34 (see FIG. 6), which includes an element delay 65 and a driver 66.

The element delay 65 delays signal for one or plural specified light emitting devices so as to adjust the emission timing of each light emitting device of the array 33. The light emitting devices of the array 33 are arranged in zigzag or stepwise formation so as to attain the greatest possible spacial interval from each other. Such a physical arrangement prevents the emission efficiency of each light emitting device from lowering due to heat generation of the light emitting device. Adjustment of the emission timing of each light emitting device is required to align light beams irradiated from the light emitting devices on an inner face of the photosensitive film 3 (see FIG. 2 ).

Figure 8:
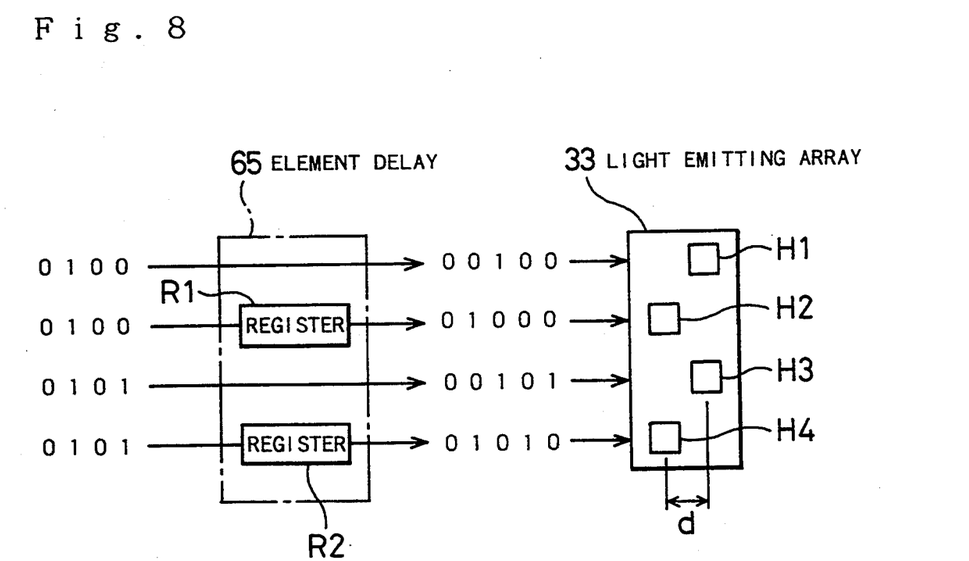
FIG. 8 shows function of an element delay.

The exact process of this adjustment is described according to an example of FIG. 8. When the light emitting devices H1 through H4 of the array 33 are arranged zigzag as shown in FIG. 8, the parallel pixel signals S14 to be output to the two light emitting devices H2 and H4 are shifted left with registers R1 and R2, respectively. The element delay 65 includes registers R1 and R2. The distance d between the two light emitting devices H2 and H4 and the other two light emitting devices H1 and H3 corresponds to one pixel pitch on the inner face of the photosensitive film 3 (see FIG. 2). One-bit shift of the pixel signals S14 for the two light emitting devices H2 and H4 prevents one-pixel shift between adjacent scanning lines in the image recorded on the photosensitive film 3.

The PLL circuit 63 of the serial/parallel converter unit 32 extracts clock components from the serial data S11 to generate a clock signal S16, and outputs the clock signal S16 to the serial data demodulator 62, the band memory unit 64 and the element delay 65. The serial data demodulator 62 receives the clock signal S16 as a clock signal for data separation; the band memory unit 64 as a clock signal for reading and writing; and the element delay 65 as a clock signal for data input.

The driver 66 receives parallel pixel signals S15 output from the element delay 65 and actuates the light emitting devices of the array 33 responsive to the pixel signals S15.

The following explains the operation of the drum 5 of the drum-inner-face scanning type image recording apparatus 1 of the present invention.

As illustrated in FIG. 2, a light beam modulated according to binary image data representing an image to be recorded is emitted from the light beam output unit 11, travels along the center axis AX of the drum 5 in the direction y, and goes into the light receiving device 30 of the scanning unit 7. The modulated light beam is converted into serial data by the light receiving device 30 and further converted to parallel pixel signals by the serial/parallel converter unit 32. The driver unit 34 drives the light emitting devices of the array 33 responsive to these parallel pixel signals. Consequently, the light emitting devices of the array 33 emit four light beams corresponding to the binary image data representing the image to be recorded.

Each light emitting device of the array 33 emits a light beam in a direction (z direction in FIG. 2) perpendicular to the center axis AX of the drum 5. The four light beams emitted from the light emitting devices of the array 33 go into the focusing lens 35, pass through the opening 36 of the cylinder element 21, and reach the photosensitive film 3 held on the inner face of the drum 5. The light beam spots formed on the photosensitive film 3 by the four light beams from the array 33 are disposed parallel to the center axis AX of the drum 5.

With rotation of the scanning unit 7, the direction of emission from the light emitting devices of the array 33 is rotated about the center axis AX of the drum 5. Namely, the light beam spots on the photosensitive film 3 are rotated about the center axis AX in the circumferential direction of the drum 5 while being aligned parallel to the center axis AX of the drum 5. The disposition of light beam spots on the photosensitive film 3 is not changed by the scanning position.

The base 13 with the various elements mounted thereon (see FIG. 3) is reciprocated by a reciprocating mechanism (not shown) along the center axis. AX in the drum 5. The reciprocating mechanism may be of any known type with a ball screw element driven by a sub-scanning motor. In the drum-inner-face scanning image recording apparatus 1 of the embodiment, four light beams irradiated to the inner face of the drum 5 are rotated about the center axis AX of the drum 5 while being shifted from a predetermined position along the center axis AX. Consequently, the inner face of the drum 5 is spirally exposed, and a desirable image is recorded onto the whole area of the photosensitive film 3 held on the inner face of the drum 5.

As described above, in the image recording apparatus 1 thus constructed, the disposition of the light beam spots formed on the inner face of the drum 5 by four light beams emitted from the array 33 is not changed by the scanning position (position in the circumferential direction of the drum 5). This feature of the embodiment allows accurate image recording with four channel light beams. Although the array 33 includes four light emitting devices in the embodiment, any number of light beam channels may be applied instead.

In the embodiment, the generator 40 disposed on the circumference of the connection shaft 24 generates required power through rotation of the main scanning motor 9 and supplies the generated power into the cylinder element 21. This structure of the embodiment ensures efficient and stable power supply to the circuits in the cylinder element 21.

Figure 9:
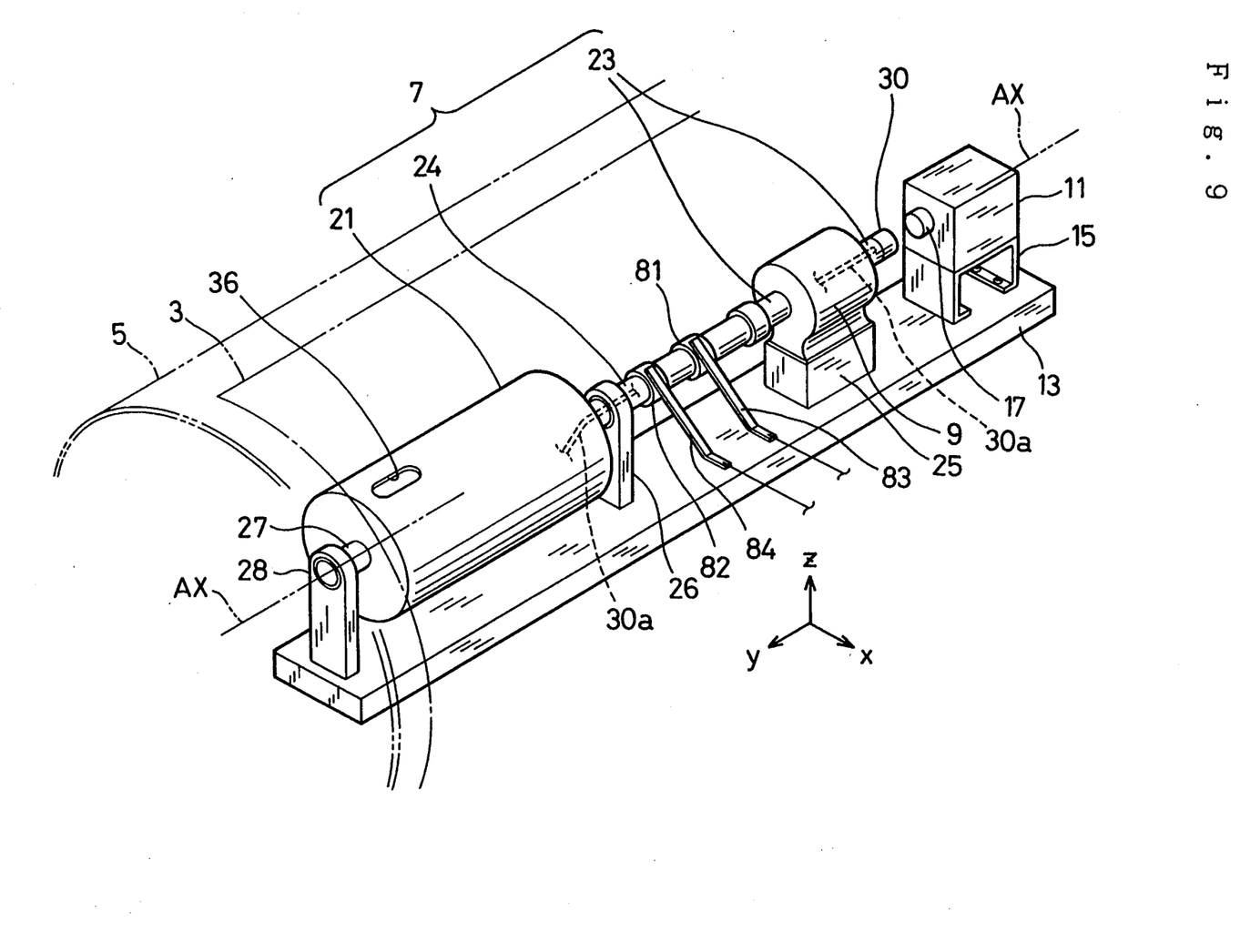
FIG. 9 is a schematic view illustrating a drum-inner-face scanning image recording apparatus as another embodiment of the invention.

FIG. 9 illustrates another drum-inner-face scanning image recording apparatus with a different power supply mechanism. In this embodiment, slip rings or collector rings 81 and 82 are attached on the circumference of the connection shaft 24 of the scanning unit 7 as seen in FIG. 9. Brushes 83 and 84 are brought into contact with the slip rings 81 and 82, respectively. Power is supplied into the cylinder element 21 by the combined function of the slip rings 81 and 82 and the brushes 83 and 84.

In such a structure, having the brushes 83, 84 in contact with the slip rings 81, 82, however, spark at the contact may cause undesirable noise, and moreover, variation in contact resistance may vary the voltage of power supply. The first embodiment including the generator 40 disposed around the connection shaft 24 described above, on the other hand, does not have any contact between the slip rings and the brushes and is thus free from such problems.

Alternatively, power supply into the cylinder element 21 may be implemented with batteries although such a system requires frequent replacement of the batteries.

It will thus be seen that the invention efficiently attains the objects set forth above, including those made apparent from the preceding description. It will also be understood that changes may be made in the above construction and in the foregoing sequences and operation without departing from the scope of the invention.

The following claims are intended to cover all of the generic and specific features of the invention as described herein, and all statements of the scope of the invention which, as a matter of language, might be said to fall therebetween.

What is claimed is:

1. An apparatus for scanning an inner face of a cylindrical member with a light beam, comprising:
    light beam output means for emitting a first modulated light beam in response to given image data;
    optical/electrical signal converter means, disposed on a center axis of said cylindrical member apart from said light beam output means, for receiving said first modulated light beam, and converting said first modulated light beam into an image signal representing said image;
    a light beam emitter, mounted around the center axis of said cylindrical member, for emitting a second modulated light beam toward the inner face of said cylindrical member in response to said image signal; and
    scanning means for integrally rotating said optical-/electrical signal converter means and said light beam emitter about the center axis of said cylindrical member, to thereby scan a recording medium held on the inner face of said cylindrical member with said second modulated light beam.

2. An apparatus for scanning an inner face of a cylindrical member with plural light beams, comprising:
    light beam output means for emitting a first modulated light beam in response to given image data, said given image data representing an image along a scanning line on said image;
    optical/electrical signal converter means, disposed on a center axis of said cylindrical member apart from said light beam output means, for receiving said first modulated light beam, and converting said first modulated light beam into parallel image signals representing said image on plural scanning lines;
    a plural-light-beam emitter, mounted around the center axis of said cylindrical member, for emitting a plurality of modulated light beams toward inner face of said cylindrical member in response to said the parallel image signals; and
    scanning means for integrally rotating said optical-/electrical signal converter means and said plural-light beams emitter about the center axis of said cylindrical member, to thereby scan a recording medium held on the inner face of said cylindrical member with said plurality of modulated light beams.

3. An apparatus in accordance with claim 2, wherein said optical/electrical signal converter means further includes:
    an optical/serial converter for receiving said first modulated light beam emitted from said light beam output means and generating serial image signals corresponding to the intensity of the modulated light beam; and
    a serial/parallel converter for converting said serial image signals into said parallel image signals.

4. An apparatus in accordance with claim 3, further comprising:
    a support member, disposed within said cylindrical member, for supporting said optical/serial converter member, said serial/parallel converter, and said plural-light-beam emitter; and wherein
    said scanning means includes means for rotating said support member about the center axis of said cylindrical member.

5. An apparatus in accordance with claim 3, wherein said plural-light-beam emitter comprises:
    a plurality of light emitting devices arranged in parallel with the center axis of said cylindrical member.

6. An apparatus in accordance with claim 3, wherein:
    at least one of said plurality of light emitting devices is positionally shifted in a direction perpendicular to the center axis of said cylindrical member; and
    said apparatus further includes a delay processor for delaying at least one of parallel image signals to be supplied to said shifted light emitting devise according to an amount of the positional shift.

7. An apparatus in accordance with claim 2, wherein said given image data is a program written in a page description language; and
    said light beam output means further includes means for interpreting said program, and generating said first modulated light beam based on said program.

8. An apparatus in accordance with claim 3, wherein said serial/parallel converter further includes:
    a memory element having a memory matrix for $M \times N$ pixels, where M is an integer representing a maximum number of pixels in a main scanning direction of said image, and N is an integer equal to the number of said plural scanning lines;
    means for successively writing said serial image signals in said memory matrix; and
    means for reading N-bit parallel image signals out of said memory matrix.

9. An apparatus in accordance with claim 8, wherein said memory element includes two memory matrices of $M \times N$ pixels which said image signals are written in and read out of in a complementary manner.

10. An apparatus in accordance with claim 4, wherein said scanning means includes:
    a driving motor having a shaft connected to one end of said support member and rotating said support member about the center axis of said cylindrical member.

11. An apparatus in accordance with claim 10, further comprising:
    a base, disposed inside said cylindrical member, for supporting said driving motor and said support member; and
    means for moving said base along the center axis of said cylindrical member.

12. An apparatus in accordance with claim 11, further comprising a rotary encoder, disposed on a shaft of said driving motor, for outputting a pulse signal corresponding to every revolution of said shaft; and wherein
    said given image data is a program written in a page description language; and said light beam output means further comprises:

binary image data generating means for interpreting said program, and generating binary image data based on said program;

driving means for driving said predetermined number of light emitting devices in response to said binary image data; and output timing control means for controlling output timing of the binary image data output from said binary image data generating means to said driving means based on said pulse signal output from said rotary encoder.

13. An apparatus in accordance with claim 4, further comprising:

a generator, disposed on said support member, for converting energy of rotation of said support member into electric power; and power supply means for supplying said electric power to said optical/serial converter, said serial/parallel converter, and said plural-light-beam emitter.

14. An apparatus in accordance with claim 4, further comprising:

a conductive slip ring mounted on the circumference of said support member;

conductive brushes, disposed in contact with said slip ring, for sending electric power supplied from an external device to said slip ring; and power supply means for supplying said electrical power received by said slip ring to said optical/serial converter, said serial/parallel converter, and said plural-light-beam emitter.

15. An apparatus in accordance with claim 4, further comprising a battery disposed on said support member.

16. A method of scanning an inner face of a cylindrical member with a light beam, comprising the steps of:

(a) emitting a first modulated light beam in response to given image data;

(b) receiving said first modulated light beam emitted in said step (a), converting said first modulated light beam into an electrical image signal representing said image;

(c) emitting a second modulated light beam toward the inner face of said cylindrical member in response to said electrical image signal; and (d) scanning a recording medium held on the inner face of said cylindrical member with said second modulated light beam by rotating an electrical path of said electrical image signal and an optical path of said light beam about the center axis of said cylindrical member simultaneously with execution of said steps (b) and (c).

17. A method in accordance with claim 16, wherein:

said electrical image signal generated in step (b) includes parallel image signals; and said light beam emitting in step (c) comprises a predetermined number of light beams corresponding to said parallel image signals.

18. A method in accordance with claim 17, wherein said step (b) further includes the steps of:

(b-1) receiving said first modulated light beam emitted in said step (a) and generating serial image signals corresponding to the intensity of the modulated light beam; and (b-2) converting said serial image signals into said parallel image signals.

19. A method in accordance with claim 18, wherein said step (a) further includes the step of:

(a-1) interpreting said image data written in a page description language, and generating said first modulated light beam based on said program.

20. A method in accordance with claim 18, wherein said step (b-2) further includes the step of:

(b-2-1) successively writing said serial image signals into a memory matrix for $M \times N$ pixels, where M is an integer representing a maximum number of pixels in a main scanning direction of said image, and N is an integer equal to the number of said plural scanning lines;

(b-2-2) reading N-bit parallel image signals out of said memory matrix.

* * * * *